July 8, 1958  J. A. DREYFUS  2,842,421
DYNAMIC INDICATORS
Filed July 6, 1951  6 Sheets-Sheet 1

INVENTOR
JEAN ALBERT DREYFUS

July 8, 1958

J. A. DREYFUS

2,842,421

DYNAMIC INDICATORS

Filed July 6, 1951

INVENTOR
JEAN ALBERT DREYFUS

July 8, 1958            J. A. DREYFUS            2,842,421
DYNAMIC INDICATORS Filed July 6, 1951                          6 Sheets—Sheet 3

INVENTOR
JEAN ALBERT DREYFUS

July 8, 1958  J. A. DREYFUS  2,842,421
DYNAMIC INDICATORS

Filed July 6, 1951 6 Sheets-Sheet 4

INVENTOR
JEAN ALBERT DREYFUS

INVENTOR
JEAN ALBERT DREYFUS ated July 8, 1958

United States Patent Office 2,842,421

2,842,421

DYNAMIC INDICATORS

Jean Albert Dreyfus, Geneva, Switzerland

Application July 6, 1951, Serial No. 235,529

Claims priority, application Switzerland July 7, 1950

19 Claims. (Cl. 346—116)

Dynamic indicators, such as for example direct reading ammeters, recording ammeters, electro-mechanical oscillographs or other similar apparatus are known which convert electromagnetic or other forces into mechanical movements of a needle point This point can move relatively to a graduated scale, called a dial (direct reading) or inscribes graphs on a flexible and movable band, such as paper, by an inking, electro-chemical, or electro-thermal process, by engraving on paraffined or blackened, or otherwise treated paper (recording by registering).

In known devices, such as electrical measuring instruments with a movable frame or electro-mechanical oscillographs, the needle is suspended on a pivot and is subjected to the action of a spiral return spring.

According to the present invention, the spring and the pivot are formed by one and the same part, in the form of an assembly of bent spring blades.

Some forms of construction of the subject of the invention are shown by way of example in the accompanying drawings, wherein:

Figs. 28 to 34 are different views of an oscillograph executed in accordance with the type illustrated diagrammatically in Fig. 27;

Figs. 35 to 38 illustrate a modification of the control knob or button for the inking means.

According to Figs. 1 and 2, the slit blade comprises two securing points 1, 2 and a centre of oscillation 3, which is located on the axis of oscillation 4—4, hereinafter referred to as the "virtual pivot." The blade is apertured by a number of external slits 5 and internal slits 6 which are parallel to one another, and perpendicular to the virtual pivot. The internal slits are connected by slits 7 parallel to the virtual pivot.

Between the slits thus subsist parallel laminae of which the ends are connected together by short transverse portions. The length of each lamina should be at least three times larger than its width, which itself is at least three times larger than its thickness.

Figures 3, 8, 14, 15, 21:
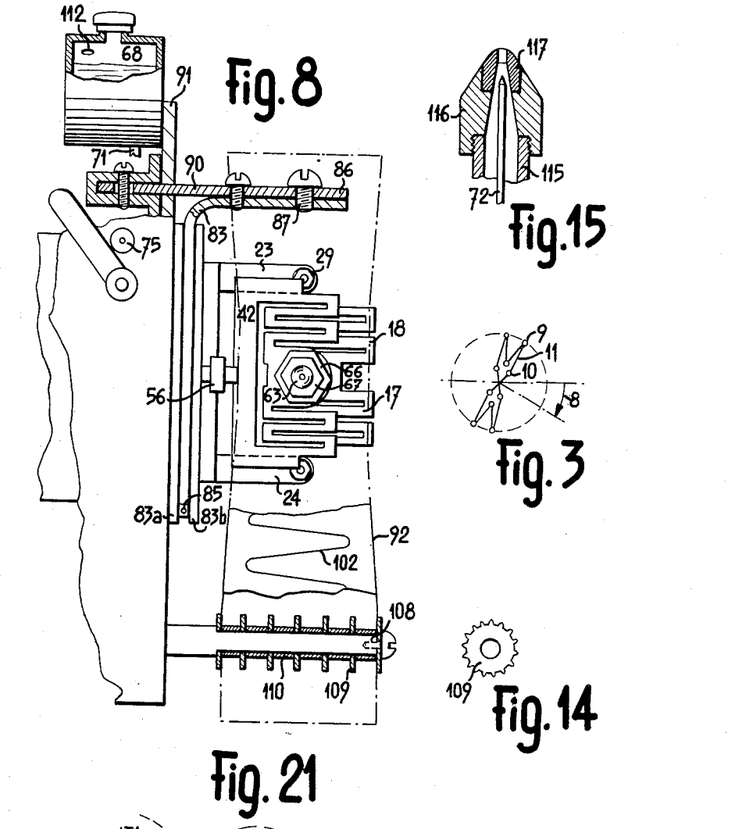
Fig. 3 is a diagrammatic section of the resilient deformation of this blade.
Fig. 8 is a front view of the apparatus in Fig. 7 parts being broken away.
Fig. 14 is a view of a toothed wheel shown in Fig. 8.
Fig. 15 is an enlarged section of a bush in Fig. 8.
Figs. 21 and 22 are sections of modified forms of the blade shown in Fig. 19.

In these conditions, Fig. 3 shows diagrammatically the resilient deformations of the blade when the centre of oscillation 3 thereof is urged by a force 8, producing a couple. All takes place as though each lamina was provided with two elementary virtual pivots 9, 10 and a rigid rod 11, each pivot being acted upon by a return force.

Although each lamina is subjected essentially to a deformation by flexion, the resultant of all the elementary flexions is a torsion of the centre 3 relatively to the fixing points 1, 2.

As the slits and laminae are arranged symetrically relatively to the virtual pivot 4—4, the blade is located in dynamic equilibrium to all frequencies of the force 8. The natural frequency of each lamina is that of an enclosed spring. By reducing the length of the laminae and by multiplying their number, it is possible to vary the natural frequency and the resultant elasticity independently of one another, which enables practically every elementary parasite frequency to be eliminated.

However, the slit blade thus described also has a defect; the rigidity of the pivot 4—4 is high in the plane of the blade, but small in the plane normal to the blade. When the circular force 8 is associated with a radial force, the pivot 4—4 may be deformed.

Figures 1, 2, 5, 9, 10, 11, 12:
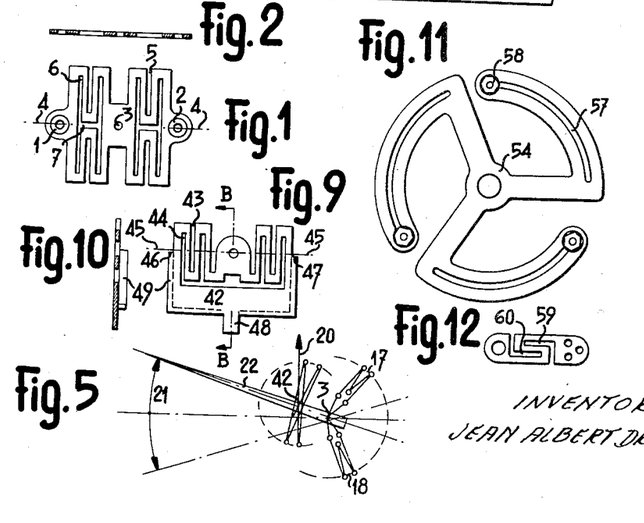
Fig. 1 is a view of a suspension blade.
Fig. 2 is a section on the line 4—4 of Fig. 1.
Fig. 5 shows diagrammatically the resilient deformations of two blades serving for the suspension and for the coupling of an oscillograph needle.
Fig. 9 is a view of a coupling blade according to Figs. 6 to 8.
Fig. 10 is a section on the line B—B of Fig. 9.
Fig. 11 is a view of a spider used in Figs. 6 to 8.
Fig. 12 is a view of a blade according to Figs. 6 to 8.
Figures 4, 7:
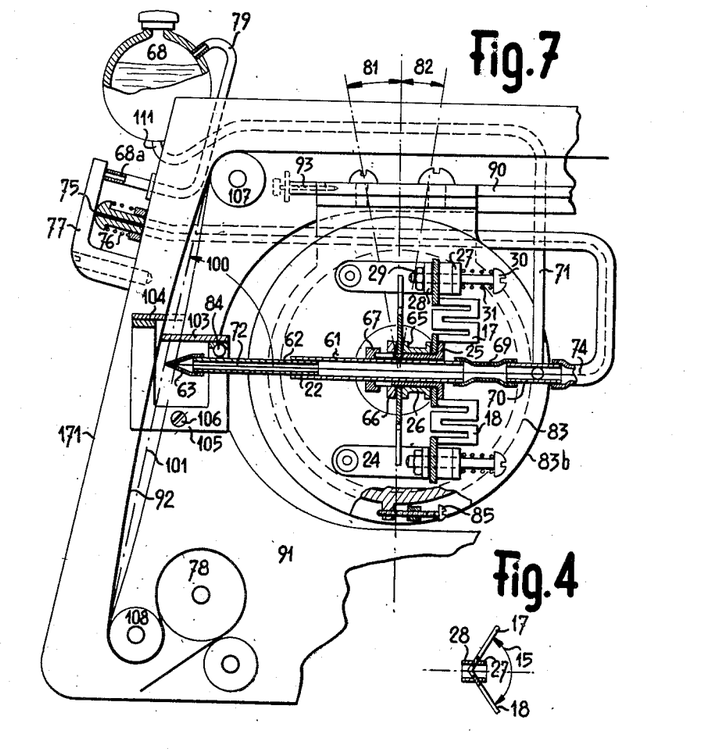
Fig. 4 is a section of the same blade after bending about the axis 4—4 of Fig. 1.
Fig. 7 is a section on the line A—A of Fig. 6

This disadvantage is eliminated when the blade in Figs. 1 to 3, is bent, according to Fig. 4, about the virtual pivot 4—4. Thus, the two halves of the blade are in two planes which intersect along the axis of the virtual pivot and which form an angle 15. When this angle is 90°, the rigidity of the pivot 4—4 has a circular symmetry. But this angle may in practice be included between 150° and 90°.

Fig. 5 shows diagrammatically the resilient deformations of the two halves 17, 18 of a blade bent at 120°, when the centre of oscillation 3 is urged by a force 20 which causes it to turn through an angle 21.

The blade may be of bronze or of steel, for example. The hardening is effected after aperturing and folding the blade.

The number of slits perpendicular to the virtual pivot 4—4 may be included between 2 and 100, for example.

The blade in Fig. 4 may serve for the suspension of an oscillograph needle 22, according to Figs. 5 to 8. The centres 3 of oscillation and of securing 1 and 2 are thus attached to the needle 22 and to the rigid supports 23, 24 respectively, by means of parts having their opposed faces arranged in the form of a V 25, 26 and 27, 28 respectively.

Figure 6:
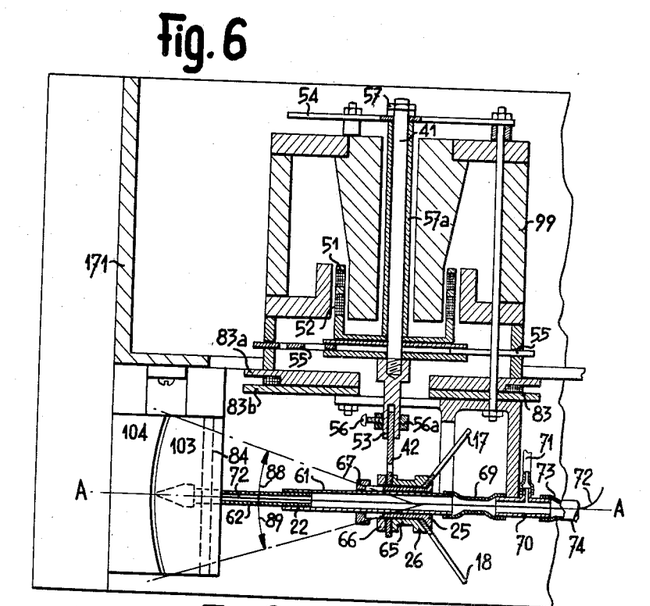
Fig. 6 is the principal section through a part of an oscillograph provided with a needle suspended by the blade in Fig. 4.

The parts 27, 28 are pressed against the rigid support 23 by the nut 29, the screw 30 and the coiled spring 31. This pressure may thus be adjusted by more or less tightening the screw. It is critical, as too strong a pressure may deform the suspension blade 17, 18 whilst too weak a pressure enables the fixing centres to vibrate.

The needle 22 is coupled to the driving spindle 41 by means of the coupling blade 42, shown in detail in Figs. 9 and 10. This blade is apertured by external slits 43 and internal slits 44, which are perpendicular to the axis of oscillation 45—45, also constituting a virtual pivot in dynamic equilibrium. This coupling blade thus converts the translatory vibrations of the spindle 41 into angular vibrations of the needle 22. These resilient deformations are indicated diagrammatically in Fig. 5. The transformation is effected without play and wear, it is free from parasite resonances or dynamic asymmetry. The parts of the coupling blade which connect the securing centres 46, 47 to the driving tongue 48 are reinforced, for example by folding them at a right angle as at 49, in order to render this part rigid.

The motor spindle 41 is secured to a movable coil which is provided with two windings 51, 52 wound side by side. This coil is suspended in the gap of a permanent magnet 99 by means of a spring blade 54 with three limbs (Fig. 11) and four slit blades 55 (Fig. 12). The blade spider 54 is provided with three circular slits 57 enabling securing screws 58 to be moved therein and thus adjusting its resilient force. The laminate 55 (Fig. 12) are each apertured by two bent slits 59, 60. They are of metal. Thus they serve at the same time for the mechanical suspension of the movable coil and for the electric feeding of the two windings 51, 52. This avoids connections by wires, which the vibrations are liable to fracture. The tongue 48 of the coupling blade is forced into a connecting slit 53 by the screw 56 of the ring 56a. The movable coil is tightened against the motor spindle 41 by means of a tube 57a and the nut 57. The spindle 41 has the shape of a rod terminated by two threads.

Figure 13:
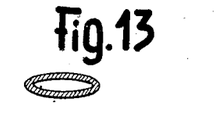
Fig. 13 is a section of a modification of the needle shown in Figs. 6 to 8.

The needle 22 consists of a number of telescopic tubes 61, 62. It is terminated by a jet head 63. The cross section of some of the tubes may be elliptical according to Fig. 13.

The part 25 of which one end is screw threaded and slit, the ring 65 and the nut 66 enable the centre of oscillation of the coupling blade 42 to be attached to that of the suspension blade 17, 18. The needle 61, 62 may be introduced into the part 25 and stopped by tightening the nut 67, of which the diameter is smaller than that of the nut 66. By means of a tube key adjusted on the nut 67 it is possible to replace the needle 61, 62 without interfering with the coupling and suspension blades. The needle 61, 62 which is hollow, is supplied by the ink reservoir 66 through the medium of the rubber fitting 69, the rigid tube 70 and the rubber tube 71.

The jet head 63 may be closed at will by the stainless steel wire 72. At the rear of the needle, the wire pierces the resilient joint 73, is guided in the tube 74 and abuts against the push button 75 which is returned by the spring 76. The push button 75 is actuated by the knob 77 which engages or disengages electrically the motor 78 for feeding the paper. Further the button 77 also enables the aeration opening 68a of the reservoir 68 to be open or closed through the medium of the tube 79.

Thus the single actuation of the knob 77 effects three operations: the engagement of the motor, the closing of the head and that of the aeration of the ink reservoir. In the normal position (Fig. 7) all the openings through which the ink can flow or evaporate are closed automatically.

The assembly of the oscillograph recorder, comprising the magnet 99 and the needle 61, 62 can turn through the angles 81, 82 (Fig. 7) in the annular bevel of suspension 83. Thus, the normal pressure of the needle 61, 62 against the oscillation guide 84 may be adjusted. This guide enables the rectitude of the oscillations to be corrected or the friction to be modified, that is to say abated. A micrometer screw 85 facilitates the adjustment of this pressure.

The bevel 83 may turn relatively to the support 86 about the axis of the screw 87, according to the angles 88, 89 (Fig. 6). Thus the zero of the needle may be varied. The axis of the screw 87 is located exactly in alignment with the virtual pivot of the suspension blade.

The support 86 can slide in the groove 90 of the rigid chassis 91 of the oscillograph. Thus the head 62 may be withdrawn from or approached towards the recording paper 92, which enables the axial pressure of oscillation of this needle to be adjusted. A micrometer screw 93 may facilitate this adjustment.

The plane 101 of the paper between the rollers 107 and 108 forms with the axis of the needle a predetermined angle 100. The circular deformation of the graph 102 is a function of the cosine of the angle 100. It is often negligible when this angle remains included between 90° and 60°. An angle between 82 and 74 degrees is advantageously selected.

In order that the pressure of the head 63 against the paper 92 remains constant, this paper is curved by the paper guides 103, 104 of which the contours conform exactly with the trajectory of the needle point 61, 62. The convex guide 103 is located at a distance from the point of the needle 61, 62 comprising from 3 to 12 millimetres. The guide 104 is located at a distance of between 4 and 20 millimetres. Thus the pressure of the needle against the paper, which is both resilient and guided, becomes negligible or sufficiently constant.

The straight line oscillation guide 84 is secured to the convex guide 103. All these guides are mounted on a U-shaped bevelled support 105 of which the position may be adjusted by means of a screw 106.

The deformation of the paper 92 by the guides 103, 104 should be symmetrical relatively to the non-deformed axis 101, in such a manner that all the longitudinal fibres of the paper are subjected to the same tension. Otherwise swelling of the paper occurs which destroys the regularity of the graphs.

When a number of needles are used to scribe in the same plane on the same paper, the paper guides may have crowns of successive curvatures provided that the deformations remain longitudinally symmetrical.

The paper is guided by rollers 107, 108. The roller 108, bearing against a paper surface still moist with ink, consists of toothed discs 109 (Fig. 14) fitted between spacers 110 (Fig. 8). The discs may be cut from a sheet of bronze of a thickness of 0.1 to 0.3 mm.

Thus the graphs remain clear, even though moist.

The ink reservoir 68 is located above and in front of the point of the needle 61, 62. On the other hand the flow hole 111 is in a position diagonal relatively to the aeration hole 112 (Fig. 8). Under these conditions the ink always flows from the reservoir towards the point, for three different positions which the apparatus may occupy, and which are shifted relatively to one another by 90°.

The reservoir 68 is removable. This enables the oscillograph to be placed under a diascopic projection apparatus without the reservoir interfering with the operation.

According to Fig. 15, the jet head may be screwed on the rear section 115 of the needle. It consists of a conical body 116 into which is forced a conical point 117 of hard material, such as sapphire, ruby, hard metal or the like. The stainless steel wire 72 enables the orifice of the head to be closed at will.

The needle and the body of the head are advantageously of light metal, such as anticorodal or peraluman. In order to avoid any corrosion or electro-chemical decomposition, the ink in the reservoir 68 should be practically neutral (pH about 7). On the other hand, it is advantageously opaque, but should not clog the needle. Thus it is advantageous to use an ink of brown colour, resulting from the addition of lamp blank to a red ink.

The obturator wire 72 should be of an electro-chemical material close to that of the needle. For example, stainless steel, when the needle is of an aluminium alloy. In order to prevent any electro-chemical current the wire 72 may be enamelled or lacquered.

Figures 16, 17, 35, 37, 38:
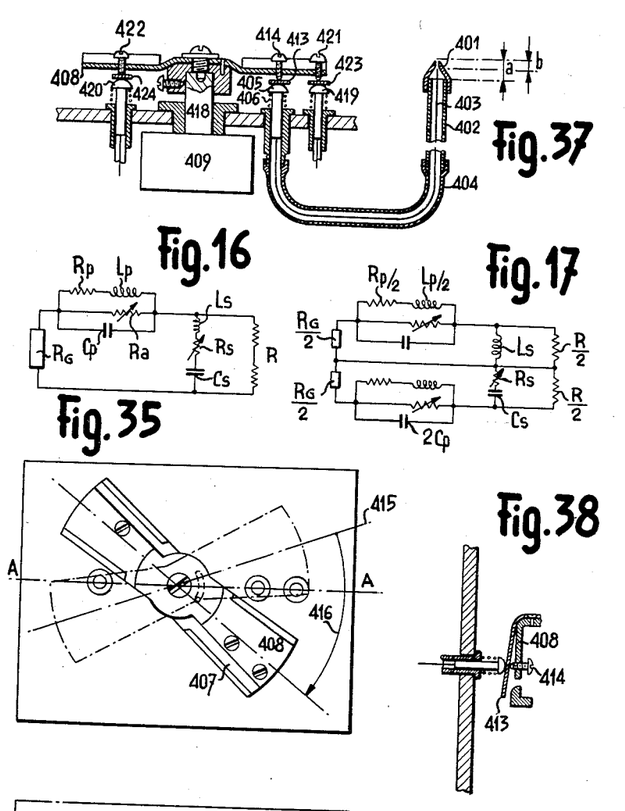
Figs. 16 and 17 are diagrams for electrically compensating mechanical resonances of the needle shown in Figs. 6 to 8.
Fig. 35 is a plan view of said inking control knob, that includes two coaxial parts.
Fig. 37 is a cross-section through line A—A of Fig. 36.
Fig. 38 is a cross-section through line B—B of Fig. 36.

According to the diagram in Fig. 16 an electric circuit may compensate the mechanical resonance of the movable equipment of the recorder of Fig. 6. This equipment comprises a mass M, an elasticity E and a friction D, which is variable in proportion to the pressure of the needle against the paper and against the oscillation guide. The coefficient of mechanical resonance is $Q_m = 6 \cdot 3 \times F \times M \div D$ where F is the frequency of resonance. It may be included between 2 and 6. The electrical resistance of the two windings 51, 52 in series is R (ohm).

To this resistance is connected in parallel the impedance comprising in series the inductance $L_p$ (henry), the resistance $R_p$ (ohm) and the capacity $C_p$ (farad). The inductive reactance $6 \cdot 3 \times F \times L$ is selected of the same order of magnitude as the resistance R of the movable coil. The factor of electric resonance of this impedance in parallel $Q_p = 6 \cdot 3 \times F \times L_p \div R_p$ is selected of the same order of magnitude as the mechanical factor $Q_m$.

Figure 18:
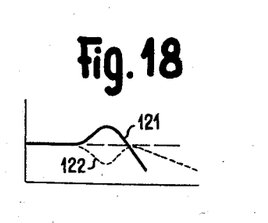
Fig. 18 shows resonance graphs which compensate themselves.

When the internal resistance $Rg$ of the electric generator of oscillations is of the same order of magnitude as the resistance R, the impedance in parallel described may compensate the mechanical resonance. According to the graph in Fig. 18, the curve of mechanical resonance 121 is compensated by the curve of electrical resonance 122 up to the vicinity of the frequency of resonance.

When the internal resistance $Rg$ is much less than R, it is possible to connect in series with the resistance R an impedance comprising in parallel the inductance $L_3$ (henry) with the resistance $R_3$ (ohm) and the capacity $C_5$ (farad). The inductive reactance $6 \cdot 3 \times F \times L_3$ is selected of the same order of magnitude as a quarter of the resistance R. Its coefficient of resonance $Q_s$ is selected of the same order of magnitude as the coefficient $Q_m$.

When the two windings 51, 52 of the movable coil are connected in push-pull, it is possible to divide the impedance-series into two symmetrical halves, according to Fig. 17.

The resistance $R_p$, $R_s$, $R_a$ may be variable to permit of varying the compensation in accordance with the various mechanical dampings.

Figure 19:
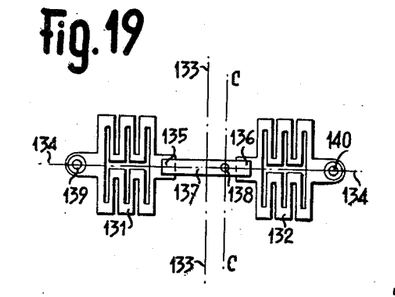
Fig. 19 is a view of a divided blade for the suspension of an oscillating spindle.
Figure 20:
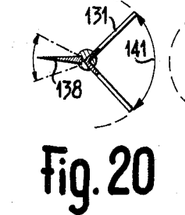
Fig. 20 is a section on the line C—C of Fig. 19.

According to Figs. 19 and 20, a slit and folded spring blade may serve for the suspension of the movable blade of a galvanometer, such as of the Darsonval type. It is divided into two halves 131, 132 arranged symmetrically on opposite sides of an axis 133—133 perpendicular to the axis 134—134 of the virtual pivot. Thus the centres of rotation 135, 136 are connected by a rigid shaft 137 which may serve as a support for the movable frame and for the needle 138. The securing centres are at 139, 140. The angle 141 between the planes of folding is advantageously of 90°. V-shaped slits are cut in the two ends of the shaft 137.

Figure 22:
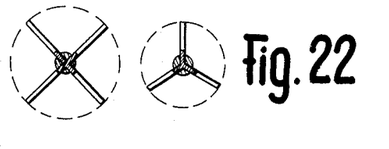

In order to increase the rigidity of the virtual pivot, it is possible to associate in the form of a cross four slit blades, according to Fig. 21, or in the form of a star with three symmetrical limbs, each formed by a half blade according to Fig. 22.

Figure 24:
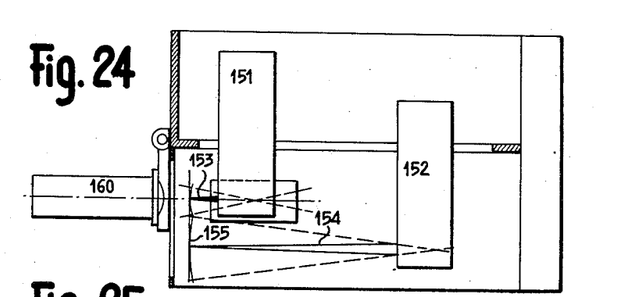

When the recorders are to have different characteristics, they may be arranged as indicated at 151, 152 in Fig. 24. As the lengths of the needles 153, 154 are different, the records may be located one behind the other, relatively to the recording paper 155. From this results an economy in position.

Figure 23:
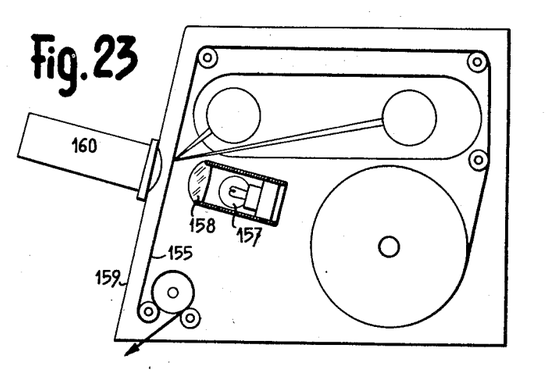
Figs. 23 to 25 are three diagrammatic views of an oscillograph with two different scribers, with a diascopic projection device.
Figure 25:
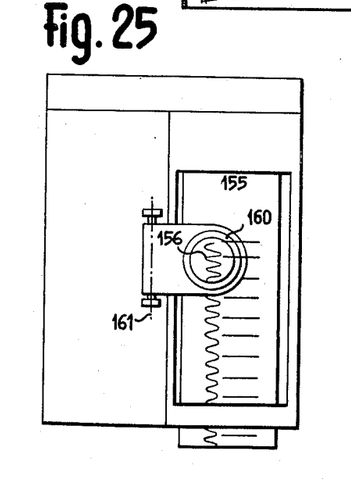

Further, Figs. 23 to 25 show an optical device permitting the diascopic projection of the graphs 156 on to a screen. The paper 155 is transparent and the ink is opaque. A source of light 157 and a condenser 158 are located in the interior of the apparatus 159, behind the transparent paper 155. An objective 160 is located in front of the apparatus 159. The objective may be mounted on a hinged device 161 enabling the objective to be withdrawn from the paper 155 so as to allow of direct observation of the graph 156.

In Fig. 6, the fitting 53 and the rings 83a and 83b which support the bevel 83 are of electrical insulating material, such as Delite, or Bakelite. Thus the magnet 99 and the armature are insulated electrically for the earth potential, which enables a high potential to be imparted to the windings, without risk of sparks in the air gap.

In Fig. 7, the needle 22 oscillates in a horizontal plane whilst the plane of the paper and the front panel 171 form with the horizontal an angle 100 included between 90 and 60 degrees. This has various advantages: it is possible to located in the horizontal plane a number of recorders in stepped formation, their needles having different lengths and their respective supports can slide in the same groove 90; the ink also flows into all the needles; the reading of the graphs is facilitated.

For each recorder may be provided an electric switch enabling the movable coil to be connected either with an external phenomenon or with a source of alternating current for feeding the motor driving the paper conveying means, this for the purpose of marking the time.

In the first embodiments described, the slotted spring blade serving as an oscillatory pivot allows transforming the translational oscillations of a control winding into angular oscillations of a needle point. The axis of the translational oscillations was perpendicular to the axis of the indicator needle when inoperative.

Figures 26, 27, 28, 29, 30, 31, 32, 33, 34:
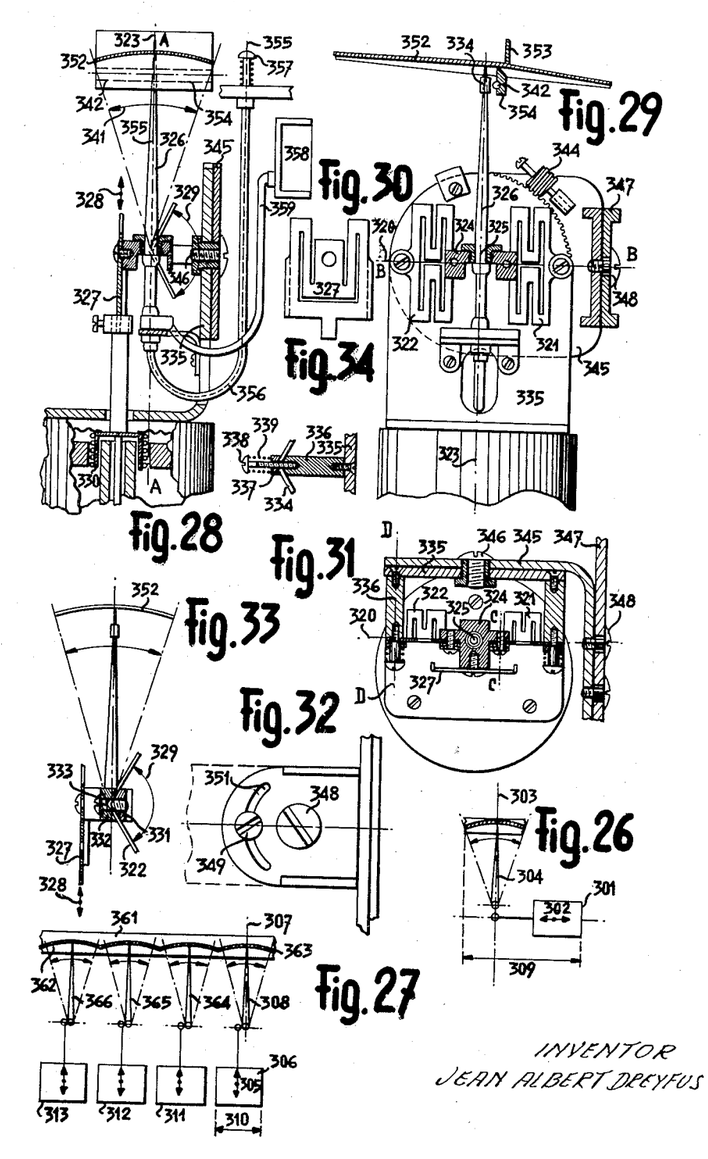
Fig. 26 is a diagrammatic illustration of the mounting provided for an oscillograph of the type illustrated in detail in Fig. 6.
Fig. 27 illustrates similarly in a diagrammatic manner and by way of comparison the mounting of a plurality of recorders arranged in a line and designed in accordance with a principle different from that of the oscillograph illustrated in Fig. 6.
Fig. 28 is a cross-section through said oscillograph.
Fig. 29 is a cross-section through line A—A of Fig. 28.
Fig. 30 shows the coupling spring of Fig. 28.
Fig. 31 is a cross-section through line B—B of Fig. 29.
Fig. 32 is a view of the square or bevel used for suspending the recorder of Fig. 28.
Fig. 33 is a cross-section through line C—C of Fig. 31.
Fig. 34 is a cross-section through line D—D of Fig. 31.
Figure 36:
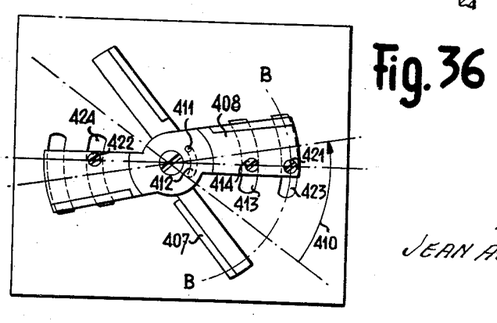
Fig. 36 is a view of said knob one of the parts of which has been shifted angularly with reference to the other.

An arrangement of the above type is illustrated diagrammatically in Fig. 26 showing a recorder 301 wherein the axis of oscillations 302 of the movable winding lie in a plane perpendicular to the axis 303 of the needle when inoperative.

In a further embodiment of the recorder as illustrated in Fig. 27, the axis 305 of the translational oscillations of the recorder winding 306 is parallel with the axis 307 of the needle 308 when inoperative. Thus the bulk 309 of the recorder considered breadthwise in the case illustrated in Fig. 26 is reduced to the breadth 310 in this latter embodiment of Fig. 27.

Consequently it becomes possible to provide a large number of recorders such as 306 and 311—313 on a same line without this leading to any exaggerated bulk.

Figs. 28 to 34 show the execution of such a recorder with various improvements.

The split spring blade serving as an oscillatory pivot having its axis at 320 is subdivided into two halves 321 and 322 arranged symmetrically with reference to the axis 323 of the needle when inoperative (Figs. 28 and 29). These two halves 321 and 322 are mechanically interconnected through a connecting member 324.

It should be remarked that the extensions of the rectangular axes of the auxiliary carrier pivots 346 and 348 cross each other at the center of symmetry of the virtual pivot 321—322 inside the connecting member 324 that assumes a U-shaped outline in the plan view of Fig. 29 and a T-shaped outline in the plan view of Fig. 31.

The center of the member 324 is perforated at 325, the perforation having an axis parallel with the arms of the U and allowing the screwing into it of the lower end of the needle 326. The central leg of the T of the member 324 connects the coupling spring 327 with the spring pivot 321—322. When the movable coil 330 executes translational oscillations in the direction of the arrow 328 (Fig. 28), the needle 326 executes an amplified angular rocking movement. Each half 321—322 of the spring pivot may be folded, as shown at 329, to an angle comprised between 120 and 90° (Fig. 33) in order to provide for the angular rigidity of said virtual pivot the axis of which lies at 320. Each lateral arm such as 331 of the member 324 is bevelled as shown in Fig. 33 so as to allow the clamping of one half of the spring pivot such as 321 through the angency of the ring 332, that is also bevelled, and of a screw 333.

The stationary part 334 of each half 322 of the pivot blade is rigid with the supporting bevel 335 as provided by a pin 336 associated with a bevelled ring 337, a screw 338 and a coil spring 339 (Fig. 34).

When rocking in the direction of the arcuate arrow 341, the needle 326 engages with slight friction the cylinder 342 (Fig. 28). The rubbing part of the needle is protected by a ring 343. The material forming the guiding cylinder 342 and the material forming the protecting ring 343 are selected so as to reduce the coefficient of friction to a minimum. For instance, the guiding cylinder or rod 342 is made of polished steel or glass and the ring 343 of polished bronze or brass.

The pressure of the needle 326 against the guiding cylinder 342 may be accurately adjusted through the agency of the micrometric screw 344 that engages the intervals between the teeth of the carrier bevel 335 which latter may pivot with reference to the suspension bevel 345 through the agency of the pivot 346.

The suspension bevel 345 may pivot in its turn with reference to the carrier 347 through the agency of the pivot 348 aligned with the axis 320 of the virtual pivot, which allows thus adjusting the neutral position of the needle 326 between the ends of the arcuate arrow 341. The screw 349 (Fig. 32) sliding in the annular groove 351 allows locking the suspension bevel 345 in the desired angular position.

The curvature of the record paper 352 in the direction parallel to the path followed by the point of the needle 326 is provided by the incurvation members 353—354 which latter also serve as supports for the guiding cylinder 342.

The needle 326 is hollow and contains a wire the axis of which is shown at 355 and that serves for closing or releasing the point of the needle. Said wire is guided inside an incurved sheath 356 and is controlled by the pusher knob 357. The ink contained inside the container 358 flows into the hollow needle 326 through the pipe 359.

In the case of a plurality of grouped recorders as in the case of Fig. 27, the incurvation members 361—362 of the record paper 363 assume the shape of a series of arcs of a circle the number of which is equal to that of the needles 308 and 364 to 366.

The inking means for the recorders described hereinabove are of the hit and miss type wherein no adjustment of the ink output is possible without a change in the output nozzle of the needle.

The modification illustrated in Figs. 35 to 38 is designed in order to allow not only a control through hit and miss of the ink output, but also one or more itermediary adjustments that may be modified according to requirements without it being necessary to change the nozzle on the needle for a nozzle of a different cross section.

In Figs. 35–38 the tip or point 401 of the hollow needle 402 that is suspended through an oscillatory pivot that is not illustrated, may be closed through a wire 403 guided inside a flexible sheath 404 as illustrated in Fig. 37. Said wire is controlled from a distance by a pusher knob 405 acting in antagonism with the spring 406. This pusher knob 405 is controlled in its turn by a rotary knob including two coaxial radially directed parts 407 and 408 controlling the electric switch 409 inserted in paper controlling circuit.

The part 407 is rigid with the switch control member. The cooperating part 408 may turn with reference thereto by an angle 410 defined by a stud 411 sliding inside the groove 412 of said first part 407 of the knob. Said part 408 carries a blade spring 413 the slope assumed by which is adjustable through the micrometric screw 414. When the arrangement is at rest, i. e. when the inking point of the needle 401 is closed by the wire 402, the two parts 407, 408 of the rotary knob are in adjacent relationship along the axis 415 in the position drawn in dot-and-dash lines in Fig. 35. A rotation of the rotary knob 407—408 through an angle 416 releases the pusher knob 405 and consequently the spring 406 returns the wire 403 into its inoperative position, the outer end of said wire being then shifted by a distance $a$ so that the nozzle in the inking point 401 is wide open. Through a rotation by an angle 410 of the part 408 only of the rotary knob, the pusher knob is engaged underneath the micrometric screw 414. This causes the wire 403 to be urged back into a position for which it is only at a distance $b$ from the original needle-closing position. Thus, the output of ink is very accurately adjustable. This allows obtaining lines of constant thicknesses although the record paper may advance at very different speeds.

In brief, the rotary knob allows three positions to be assumed, of which two correspond to the hit and miss operation, and the third to an intermediary position, said positions providing respectively: complete closure, complete opening and an intermediary position providing an accurately adjusted ink output.

Only the movement of the rotary knob between the positions of complete opening and complete closing of the needle nozzle drive the spindle 418 of the electric switch 409. The intermediary position has no action on said spindle 418.

A common rotary knob 407—408 may control a plurality of pusher knobs, such as 405—419 and 420 and consequently it may control the output of ink through a plurality of oscillograph recorder needles. The adjustments of the output are independent of one another by reason of the presence of the micrometric screws 414, 421, 422 and of the independent spring blades 413, 423, 424.

Instead of subtracting the angle 410 from the angle 416 for its intermediary position, these two angles may be added, but in this case the parts 407 and 408 of the rotary knob should form a rigid unit having a larger width.

What I claim is:

1. In a dynamic indicator adapted to transform the energy produced by driving means into the angular shifting of at least one indicator needle over a cooperating surface, the provision of a system of spring blades suspending the needle through one point, said system comprising laminae joined alternately in pairs at their inner and outer ends and separated by parallel slits formed therein, the blades of said system being arranged in star formation in their plane to form a virtual pivot adapted to assume an elastic deformation along its axis and round same and a support to which the outer ends of the spring blade system are secured.

2. In a dynamic indicator having driving means, and at least one indicator needle movable over a cooperating surface, the provision of a spring blade having bent portions extending on opposite sides of a longitudinal axis, said blade being provided with transverse slots arranged symmetrically with reference to said longitudinal axis and extending between two points at small distances from the corresponding edges of the blade and alternatingly with further transverse slots arranged symmetrically with reference to the longitudinal axis of the blade and extending between the outer edges of the blade and points at a small distance from the longitudinal axis of the blade, and forming laminae joined alternately in pairs at their inner and outer ends, whereby the slots have the form of letters U and I, means securing the needle to a point on the longitudinal axis of the blade, and means connected with said driving means and firmly engaging two points of the blade on either side of the securing point of the needle near either end of the longitudinal axis and upon said longitudinal axis.

3. In a dynamic indicator having an electrically actuated driving spindle, and at least one indicator needle movable over a cooperating surface, the provision of a spring blade having a longitudinal axis and provided with transverse slots arranged symmetrically with reference to said longitudinal axis of the blade and extending between two points at small distances from the corresponding edges of the blade and alternatingly with further transverse slots arranged symmetrically with reference to the longitudinal axis of the blade and extending between the outer edges of the blade and points at a small distance from said longitudinal axis of the blade and forming laminae joined alternately in pairs at their inner and outer ends, means supporting said needle upon a point on said longitudinal axis, and means connecting said driving spindle to at least one other point on said longitudinal axis, said blade being folded in two planes meeting on the longitudinal axis of the blade and the angle between said planes ranging substantially between 90 and 150°, whereby said needle is swingable about said longitudinal axis.

4. In a dynamic indicator having electrical driving means and at least one indicator needle movable over a cooperating surface, the provision of a spring blade having a longitudinal axis and provided with transverse slots arranged symmetrically with reference to the longitudinal axis of the blade and extending between two points at small distances from the corresponding edges of the blade and alternatingly with further transverse slots arranged symmetrically with reference to the longitudinal axis of the blade and extending between the outer edges of the blade and points at a small distance from the longitudinal axis of the blade and forming laminae joined alternately in pairs at their inner and outer ends, whereby the slots have the form of letters U and letters I separated from the letters U, means connected with said spring blade and holding the needle at a point on the longitudinal axis of the spring blade, and means connecting said blade to said electrical driving means.

5. In a dynamic indicator adapted to transform the energy produced by driving means into the angular shifting of at least one indicator needle over a cooperating surface, the provision of a system of spring blades engaging the needle through one point, said system comprising laminae joined alternately in pairs at their inner and outer ends and separated by parallel slits formed therein the blades of said system being arranged in star formation in their plane to form a virtual pivot adapted to assume an elastic deformation along its axis and round same, said blades being bent and including arcuate parts provided with part circular slots, a support, screws engaging said blade slots at adjustable points thereof and rigidly screwed into the support, a movable winding forming part of the driving means, a frame and means connecting said winding to the frame and including blades arranged radially and terminating with longitudinally slotted arcuate elements and screws engaging each adjustable point of the slot in the corresponding arcuate element and screwed into the frame.

6. A dynamic indicator having a casing and driving means therein, and comprising an angularly movable needle including a plurality of telescopically interengaging tubes, said needle having a base at one end and a removable nozzle of conical shape at the other end, and a perforated tip of hard material fitted in said nozzle, a wire longitudinally movable inside the telescopic tubes of the needle and adapted to engage the perforation in the tip thereof to close same, means controlling the movements of said wire, a spring resiliently supporting said needle adjacent the base thereof, means connecting said spring with said driving means, a resilient joint connected with the base of the needle, said wire piercing said joint, a tube connected with said joint and carried by said casing, a movable record paper cooperating with the needle tip, and means connected with the first mentioned means and controlling simultaneously the progression of the paper in front of the needle tip and the release of the needle tip by the wire.

7. In a dynamic indicator adapted to transform the energy produced by driving means into the angular shifting of at least one indicator needle over a cooperating surface under the action of said driving means, the provision of a system of bent spring blades engaging the needle through one point to allow the latter to pivot in a predetermined plane, said system comprising laminae joined alternately in pairs at their inner and outer ends and separated by parallel slits formed therein, a support to which the outer ends of the spring blade system are secured, a paper strip over which the needle point is adapted to produce a record as it moves round its point of connection with the spring blade system, a convex guide and a concave guide between which guides said strip is adapted to move, said guides being located at a distance from said plane to avoid the rubbing of the needle point on the paper, and means controlling the progression of the paper in front of the needle point.

8. In a dynamic indicator adapted to transform the energy produced by driving means, the combination of at least one hollow indicator needle, a spring blade system, means engaging the needle through one point to allow the latter to pivot in a predetermined plane symmetrical with reference to the blade system under the action of said driving means, and a support to which the outer ends of the spring blade system are secured, with an ink reservoir adapted to feed the hollow needle, means for closing said reservoir against the admission of air, means feeding a record strip in front of the needle point and means simultaneously controlling last mentioned means and the reservoir closing means.

9. In a dynamic indicator adapted to transform the energy produced by driving means, the combination of at least one hollow indicator needle, a spring blade system, means engaging the needle through one point to allow the latter to pivot under the action of the driving means in a predetermined plane symmetrical with reference to the blade system, and a support to which the outer ends of the spring blade system are secured, with an ink reservoir adapted to feed the hollow needle, stationary means carrying the ink reservoir above the operative needle point and in front of the latter, means for closing said reservoir against the admission of air, means feeding a record strip in front of the needle point and means simultaneously controlling last mentioned means and the reservoir closing means.

10. In a dynamic indicator adapted to transform the energy produced by driving means into the angular shifting of at least one indicator needle over a cooperating surface under the action of said driving means, the provision of a system of flexible spring blades engaging the needle through one point to allow the latter to pivot in a predetermined plane, a support to which the outer ends of the spring blade system are secured, a paper strip over which the needle point is adapted to produce a record as it moves round its point of connection with the spring blade system, a convex guide and a concave guide between which guides said strip is adapted to move, said guides being located at a distance from said plane to avoid the rubbing of the needle point on the paper, means controlling the progression of the paper in front of the needle point and a guiding roller for the paper strip including in transverse superposition a plurality of thin toothed discs.

11. In a dynamic indicator, the combination of a plurality of control recorders arranged stepwise, a plurality of needles arranged in alignment for engagement with a common surface, the length of the needles being different, a system of flexible spring blades engaging each needle through one point to allow the latter to pivot under the action of the corresponding recorders in a plane, said system comprising laminae joined alternately in pairs at their inner and outer ends and separated by parallel slits formed therein, and a support to which the outer ends of each spring blade system are secured.

12. In a dynamic indicator adapted to transform the energy produced by driving means, the combination of at least one indicator needle adapted to produce an opaque record on transparent paper, a source of light, an objective through which said source of light is adapted to project an image of the record simultaneously with the operation of the indicator needle, a system of flexible blades engaging the needle through one point to allow the latter to pivot under the action of the driving means in a plane symmetrical with reference to the blade system, said blade system lying, when inoperative, in a common plane that is substantially perpendicular to the axis of the needle and a support to which the outer ends of the spring blade system are secured.

13. In a dynamic indicator adapted to transform the energy produced by driving means, the combination of at least one indicator needle adapted to produce an opaque record on transparent paper, a source of light, an objective through which said source of light is adapted to project an image of the record simultaneously with the operation of the indicator needle, an angularly collapsible carrier for said objective, a system of flexible blades engaging the needle through one point to allow the latter to pivot under the action of the driving means in a plane symmetrical with reference to the blade system, said blade system lying, when inoperative, in a common plane that is substantially perpendicular to the axis of the needle and a support to which the outer ends of the spring blade system are secured.

14. In a dynamic indicator adapted to transform the energy produced by driving means, the combination of at least one indicator needle, a system of flexible spring blades engaging the needle through one point to allow the latter to pivot under the action of the driving means in a plane symmetrical with reference to the blade system, said system comprising laminae joined alternately in pairs at their inner and outer ends and separated by parallel slits formed therein, the blades of said system being arranged in star formation, and means connecting the needle with the driving means and including a yielding blade.

15. In a dynamic indicator adapted to transform the energy produced by driving means, the combination of at least one indicator needle, a system of two spring blades arranged symmetrically to either side of the needle and connected therewith to allow said needle to pivot under the action of the driving means, said system comprising laminae joined alternately in pairs at their inner and outer ends and separated by parallel slits formed therein, the axis of the needle when inoperative being arranged in substantial parallelism with the direction of the translational oscillations of the driving means, said needle being adapted to rock in a plane, a support to which the outer ends of the spring blade system are secured, a carrier for said support including two auxiliary pivots, the axes of which are orthogonal to each other and meet at the center of symmetry of the spring blade system, one of said pivots securing adjustably the support to the carrier and a frame to which the carrier is adjustably secured through the other pivot.

16. In a dynamic indicator adapted to transform the energy produced by driving means into the angular shifting of at least one hollow indicator needle over a cooperating surface under the action of said driving means, said indicator having a spring blade system, the combination of means engaging the needle through one point to allow the latter to pivot in a predetermined plane symmetrical with reference to the blade system, and a support to which the outer ends of the spring blade system are secured, with an ink container feeding said hollow needle, a nozzle at the outer end of the needle, a record strip engaged by the needle nozzle, means for adjusting the output of ink through said nozzle including a wire fitted inside the needle and the outer end of which is adapted to close the opening in the nozzle at the end of the needle or to leave a passage of predetermined cross-sectional area for the passage of the ink according to the position assumed by the wire inside the needle, a pusher knob controlling the position of the outer end of the wire, a switch including a rotary control knob adapted to assume two angular switch-operating positions, means whereby the rotary knob controls the pusher knob to engage the wire into its operative nozzle-closing and nozzle-opening positions for said two angular positions respectively and means controlled by the pusher knob for engaging the wire into an intermediary adjustable position, a convex guide and a concave guide between which guides said strip is adapted to move and means controlling the progression of the strip in front of the needle point and means whereby said switch controls the operation of last mentioned means.

17. In a dynamic indicator adapted to transform the energy produced by driving means into the angular shifting of at least one hollow indicator needle over a cooperating surface under the action of said driving means, said indicator having a spring blade system the combination of means engaging the needle through one point to allow the latter to pivot in a predetermined plane symmetrical with reference to the blade system, and a support to which the outer ends of the spring blade system are secured, with an ink container feeding said hollow needle, a nozzle, at the outer end of the needle a record strip engaged by the needle nozzle, means for adjusting the output of ink through said nozzle including a wire fitted inside the needle and the outer end of which is adapted to close the opening in the nozzle at the end of the needle or to leave a passage of predetermined cross-sectional area for the passage of the ink according to the position assumed by the wire inside the needle, a pusher knob controlling the position of the outer end of the wire, a switch including a rotary control knob adapted to assume two angular switch-operating positions, said rotary knob including a spring blade of adjustable size adapted to engage the pusher knob for a further angular position of the rotary knob to set the wire in a corresponding intermediary position, a convex guide and a concave guide between which guides said strip is adapted to move and means controlling the progression of the paper in front of the needle point and means whereby said switch controls the operation of last mentioned means.

18. A dynamic indicator comprising a stationary frame, an electromagnetic control system including a section adapted to assume a longitudinal movement with reference to the frame, an indicator needle, two spring blades provided with a plurality of incomplete transverse slits and to the center of which the needle is secured through corresponding points of its length, the outer ends of the two spring blades being connected respectively with the frame for one blade and with the movable section of the electromagnetic system for the other.

19. A dynamic indicator comprising a stationary frame, an electromagnetic coil, a spring blade connecting yieldingly said coil with the frame to allow the said coil when energized to assume a longitudinal movement with reference to the frame, an indicator needle, two spring blades provided with a plurality of incomplete transverse slits and to the center of which the needle is secured through corresponding points of its length, the outer ends of the two spring blades being connected respectively with the frame for one blade and with the movable section of the electromagnetic system for the other.

References Cited in the file of this patent

UNITED STATES PATENTS

| | | |
|---|---|---|
| 860,666 | Iszard | July 23, 1907 |
| 1,324,054 | Irwin | Dec. 9, 1919 |
| 1,392,430 | Marsh | Oct. 4, 1921 |
| 1,785,478 | Delaney | Dec. 16, 1930 |
| 2,125,983 | Bettison et al. | Aug. 9, 1938 |
| 2,127,331 | Fulton | Aug. 16, 1938 |
| 2,176,777 | Tate | Oct. 17, 1939 |
| 2,363,799 | Mahurin | Nov. 28, 1944 |
| 2,606,093 | Reason | Aug. 5, 1952 |
| 2,619,933 | Gordon | Dec. 2, 1952 |

FOREIGN PATENTS

| | | |
|---|---|---|
| 21,746 | Great Britain | Oct. 1, 1907 |
| 3,077 | Great Britain | Feb. 11, 1908 |